March 25, 1930. A. SCHOENBERGER 1,751,762
ROPE FASTENER
Filed July 30, 1929
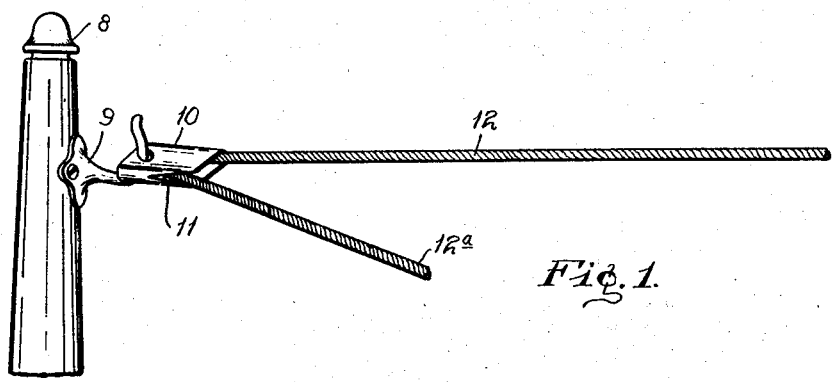
Fig. 1.
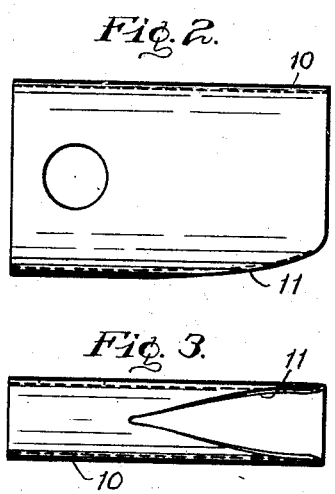
Fig. 2.
Fig. 3.
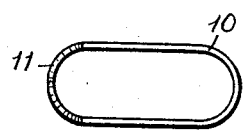
Fig. 4.
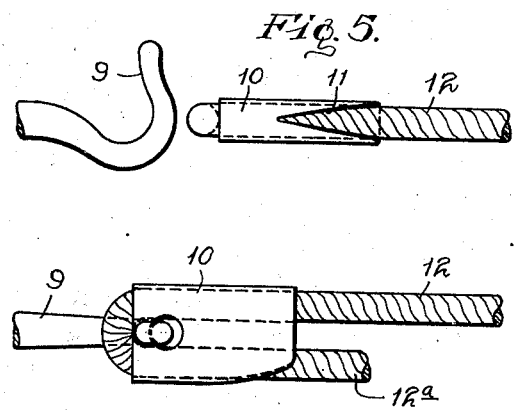
Fig. 5.
Fig. 6.
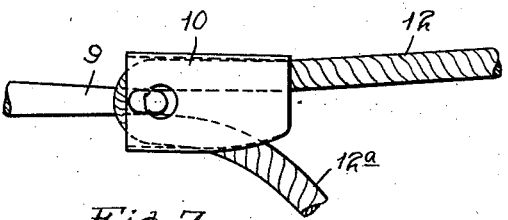
Fig. 7.
INVENTOR
Arthur Schoenberger,
By Archworth Martin,
Attorney.

Patented Mar. 25, 1930

1,751,762

UNITED STATES PATENT OFFICE

ARTHUR SCHOENBERGER, OF PITTSBURGH, PENNSYLVANIA

ROPE FASTENER

Application filed July 30, 1929. Serial No. 382,107.

My invention relates to rope fasteners, and more particularly to devices for supporting and holding ropes such as wash lines, cables, etc., under tension.

One object of my invention is to provide a gripping and supporting structure of such form that a rope or cable may be conveniently placed in assembled relation therewith and securely held thereby against accidental displacement.

Another object of my invention is to provide a fastener and supporting structure of such form that a rope associated therewith may be placed under tension by simply pulling on the free end of the rope, and wherein the rope so tensioned will be automatically maintained taut after it has been tightened.

Another object of my invention is to provide a rope tightening and fastening device of generally improved form.

One form which my invention may take is shown in the accompanying drawing wherein Figure 1 is a view showing a portion of a rope supported under tension by my fastener device; Fig. 2 is a plan view of the gripping member of Fig. 1, on an enlarged scale; Fig. 3 is an edge elevational view thereof; Fig. 4 is an end view of the same; Fig. 5 shows some of the parts of Fig. 1 in dis-assembled position; Fig. 6 shows the members of Fig. 5 assembled, ready for the tightening operation, and Fig. 7 shows the positions occupied by these parts after the rope has been tightened.

For purposes of illustration, I have shown the device as employed in connection with a rope such as employed for wash lines, but it will be understood that the invention is susceptible of use in various other relations.

In the drawing, the numeral 8 indicates a wooden clothesline post to which a hook 9 is secured by screws. It will be understood that in the case of iron posts, the hook 9 could be fastened thereto by any suitable means other than screws. A gripping member 10 is supported by the hook 9 which extends through perforations that are provided in said member. The member may be in the form of a flattened tube with a V notch 11 cut therein, and will preferably be of brass or other non-oxidizable material.

In assembling the parts, the rope 12 will be doubled adjacent to its free end and such doubled portion pushed through the gripper 10 so that when the gripper has been placed over the hook 9 as shown in Fig. 6, the rope will extend around the hook. Upon a pull being exerted upon the free end 12$^a$ of the rope, the rope will be drawn through the gripper 10 and against the rear side of the hook 9, the hook functioning as a pulley or guiding sheave so that that portion of the rope in advance of the gripper 10 will be tightened to a degree determined by the pulling force exerted on the portion 12$^a$ of the rope, it being understood that the other end of the rope is fastened to a suitable support.

Upon release of the portion 12$^a$ of the rope, such portion will lie in the V notch 11, or tend to be forced therein through the tensioned strain upon the rope and its tendency to thereby be drawn backwardly past the hook 9. In order to release the rope, the portion 12$^a$ need only be moved into approximate parallelism with the tightened portion thereof, which releases it from the V notch and permits it to slide back past the hook 9.

It will be understood that where a single rope is to be connected to several posts, a fastening device corresponding to the parts 9 and 10 may be employed for connecting the rope to each post and the rope tightened at each fastening device in succession.

I claim as my invention:—

1. Fastening structure comprising a hook, a gripping member of flattened tubular form adapted to receive a doubled portion of a rope, and having a V notch in one edge thereof and also having a perforation for the reception of the hook.

2. A fastening device comprising a flattened tubular member adapted to receive a doubled portion of a rope, the said member having a V notch extending inwardly from one end thereof and a perforation adjacent to its other end for the reception of a hook.

3. A fastening structure comprising a gripping member having an opening extending into the same of such width that a folded portion of a rope may be slid into said opening, and provided with a perforation through one side wall of said opening for receiving a hook, the opening being of such length that the hook may extend through the fold of the rope, and means for releasably securing the rope to said member to prevent longitudinal slippage thereof.

4. A fastening structure comprising a hook, a gripping member having an opening extending through the same of such width that a folded portion of a rope may be slid through said opening, the hook having engagement with the folded portion of the rope, and means on said member for releasably holding the rope against longitudinal slippage.

In testimony whereof I, the said ARTHUR SCHOENBERGER, have hereunto set my hand.

ARTHUR SCHOENBERGER.